Oct. 26, 1943.   F. P. BLAIR   2,332,982
WATER FILTER
Filed Jan. 9, 1941
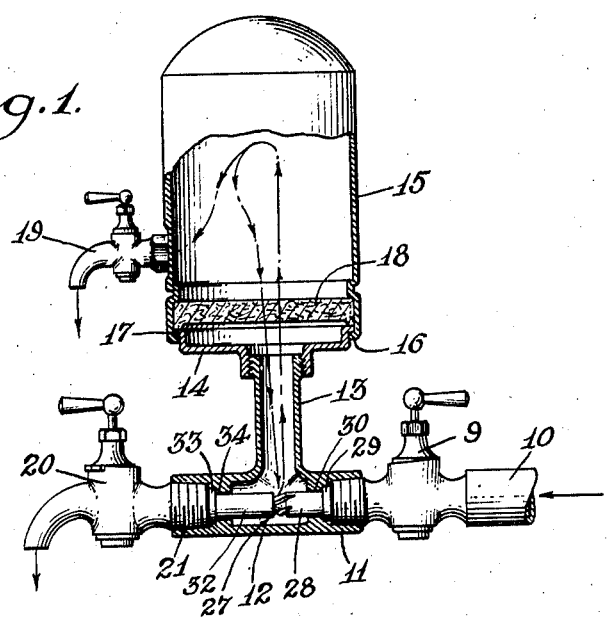
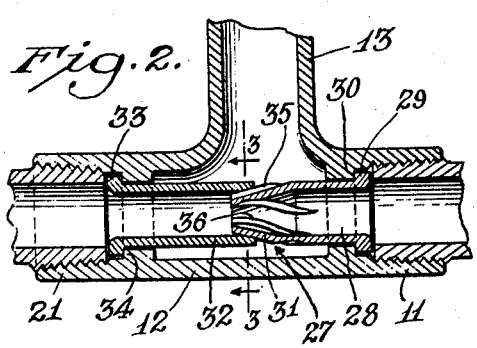
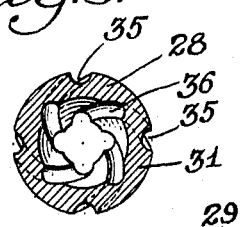
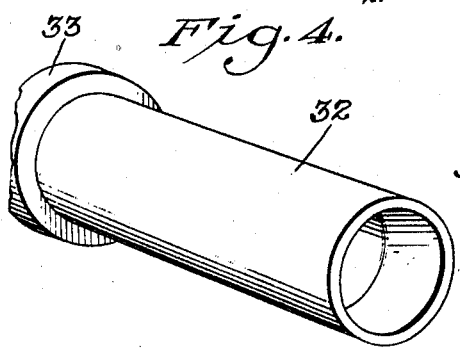
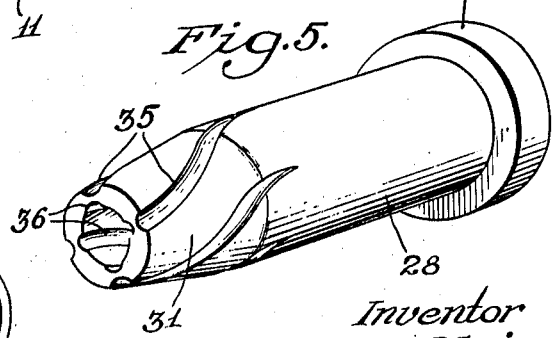
Inventor
Frank P. Blair
BY
Parker, Carlson, Pitzner & Hubbard
Attorneys.

Patented Oct. 26, 1943

2,332,982

UNITED STATES PATENT OFFICE 2,332,982

WATER FILTER

Frank P. Blair, Chicago, Ill., assignor of one-half to Raymond C. Cook, Chicago, Ill.

Application January 9, 1941, Serial No. 373,740

6 Claims. (Cl. 210—82)

The invention relates to filters and more specifically to water filters of the so-called "self-cleaning" type particularly well suited for home or domestic use in that the user may effect a cleaning or rejuvenation of the filtering element by a simple reversal of the flow of water therethrough.

It is an object of the invention to provide a new and improved water filter of the above mentioned general type wherein a strong reversing flow of water is caused to flow back through the filtering element for cleansing purposes.

More specifically stated it is an object of the invention to provide a novel filter of the type embodying a filtering element through which the water supply passes to a reservoir dome from which it is tapped and wherein novel means are provided for causing the reservoir supply of water to flow back through the filtering element with a strong cleaning force.

In conjunction with the foregoing object, it is a further object of the invention to provide in a filter of this type a novel form of suction jet which creates a partial vacuum below the filtering element for effecting a reversing flow of fluid therethrough.

Other objects and advantages of the present invention will become apparent as the following description proceeds taken in connection with the accompanying drawing in which:

Figure 1 is a side elevation partially in section showing a filter embodying the features of the present invention.

Fig. 2 is a detail sectional view on an enlarged scale of an exemplary form of suction jet employed in connection with the filter shown in Fig. 1.

Fig. 3 is a radial sectional view taken on line 3—3 of Fig. 2.

Figs. 4 and 5 are enlarged detail perspective views of interfitting members of the mechanism of Fig. 2.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In general the application and utility of domestic water filters of the type selected for illustration are well known. Thus, for example, in outlying districts away from the usual urban water facilities normally including central filtering stations, the desirability of and necessity for individual domestic water purifiers are apparent. One of the primary obstacles standing in the way of efficient, useful and permanent installations of this nature is the difficulty encountered in maintaining cleanliness and purity of the filtering element which removes suspended or sedimentatious material from the water supply. Numerous devices have been manufactured and marketed designed to obviate this troublesome problem. Up to the present time, however, a satisfactory solution has not been forthcoming, either because it has been necessary to replace the filtering element periodically or, the method employed for cleaning the filtering element has been insufficient to effect the desired result without dismantling the installation.

Examples of domestic filters may be cited wherein the cleaning is sought to be effected by reversing the flow of fluid through the filtering element to the end that suspended matter accumulated thereon during the passage of water therethrough may be washed away. The efficacy of such procedure obviously depends in large measure on the force and velocity of flow under which the reversing flow passes through the filtering element. Clearly a simple reversal of connections is insufficient since no more than the original force under which the particles were accumulated becomes available for their removal. Again a simple washing of the filter rock, screen, or other filtering element employed has been found unsatisfactory for removing particles other than those merely lying loosely on the surface of the element.

The present invention is admirably well suited for overcoming the problem outlined above by thoroughly and simply cleaning the filtering element without in any way dismantling the filter. Generally the procedure employed is to cause a supply of previously filtered water stored in a reservoir under the pressure of the source of supply to flow back through the filtering element at a relatively high velocity effected by a novel suction creating means located on the supply side of the filtering element and deriving its suction force through the agency of the water pressure of the supply source. The flow is thus created by the sum of the pressure in the reservoir and the high suction, resulting in a force much higher than the force causing the accumulation in the filtering element.

Referring more particularly to Fig. 1 of the drawing, wherein one embodiment of the present invention has been illustrated merely for purposes of disclosure, a shut-off valve 9 is mounted on a supply pipe 10 adapted for connection with a suitable source of unfiltered water under pressure. One leg 11 of a T member 12 is screw threaded on the valve and is provided with another leg member 13 which may be vertically disposed for screw threaded engagement with a base portion 14 of a reservoir dome 15. The lower edge 16 of the dome is rolled into sealing relation with a flange 17 projecting radially of the base portion 14. A filtering element 18 of any suitable type, is spaced from the bottom of the reservoir and clamped in position between an annular ring formed in the dome and the flange 17 of the base. A tap valve 19 opens in the present instance to the lower portion of the dome above the filter rock for drawing filtered water.

Water entering through the shut-off valve 19 passes upwardly through the T and into the dome 15 through the filtering element 18 and thence it is drawn for use through the tap 19. The tap opens to the lower portion of the dome so that, upon entrance of filtered water, air is trapped above the tap and compressed under the force of the line pressure, to the end that in reversing the flow through the filter rock (as hereinafter described) the energy of the compressed air may be utilized in augmenting the reversal.

The reversal is, effected in the present instance by the provision of a by-pass comprising an outlet valve 20 screw threaded on a second horizontal leg 21 of the T member which may be opened to permit the filtered water stored in the reservoir to pass downwardly through the filter rock to carry away the filtered material accumulated on the under side of the rock.

During the normal use of a filter of this type, suspended matter containing particles of varying degrees of fineness are removed from the water by the filter rock. The larger particles collect on the surface of the rock whereas finer particles may work into the interstices to a greater or less degree, ultimately causing clogging of the pores and rendering the filter ineffective. The finer particles in particular cling tenaciously to the granules of the filter rock rendering their removal extremely difficult. Accordingly, I have provided means for causing the filtered water supply in the reservoir to flow back through the filtering element with a force much greater than the force causing the filtering and thereby being sufficient to dislodge even the fine particles of material accumulated in the interstices.

The means for causing this forceful reversing flow includes, in the present instance, a suction creating device or aspirator (generally indicated at 27) positioned in the T member below the filtering element and utilizing the force of the pressure water supply to draw the water in the dome downwardly when the by-pass outlet valve 20 is opened. In normal use when filtered water is tapped from the dome, the aspirator or suction device 27 acts merely as a conduit to supply water to the dome without creating suction, the jet becoming effective to evacuate the dome only when the by-pass valve 20 is opened. The aspirator comprises a nozzle or jet member 28 suitably mounted in the T, as by a flange 29, seated against a shoulder 30 in the leg 11, so that supply water passes therethrough both during filtering and cleaning. A tapered free end 31 of the nozzle 28 is telescopically received within the end of a cooperating sleeve member 32 correspondingly flanged as at 33 and clamped between a shoulder 34 in the leg 21 and the screw threaded hub portion of the valve 20 to which it opens. Means are provided for imparting a swirling motion to the water flowing from the line through the nozzle and also a corresponding swirling motion to the water flowing downwardly from said reservoir to increase the aspirating action. To this end, the internal surface of the tapered end of the nozzle 28 is provided with spiral grooves 36 through which the water supplied from the line passes to the by-pass when the latter is tapped. The external surface of the nozzle 28 is correspondingly spirally grooved as at 35.

During the cleaning operation the valve 20 is opened permitting water under the force of the line to pass through the nozzle or jet member 28 into the sleeve member and out through its discharge outlet to the by-pass. A swirling motion is imparted to the water leaving the nozzle by the internal grooves 36 so that a turbulent flow is created in the sleeve member which has a greater internal diameter than the orifice diameter of the nozzle. This turbulence creates a strong suction drawing the reservoir water downwardly through the filter rock and into the peripheral suction intake formed between the nozzle and the telescoping sleeve 32. A swirling motion is likewise imparted to this stream of water as it passes through the external grooves 35 and into the sleeve for ejection through the valve. I have found that the suction force created by these combined swirling streams entering the sleeve member 32 creates an extremely large suction causing the water to flow from the dome downwardly through the filtering element with a force and velocity sufficient to free even the fine particles of filtered material from their lodged position within the interstices of the filtering element. Added to this is the force of the compressed air trapped in the upper portion of the dome so that the reverse flow has a much greater force than the flow causing the accumulation and thus easily, quickly and efficiently removes accumulated material from the filter rock and conditions it for further use. It is to be emphasized that the thorough and efficient cleaning of the filtering element, as described above, is effected by the mere actuation of the single by-pass valve 20.

I claim as my invention:

1. An aspirating device including, in combination, passage means having an inlet adapted to be connected to receive fluid from a source of fluid pressure and having a discharge outlet, a suction inlet connected to an intermediate portion of said passage means between said inlet and said outlet, means for bleeding pressure fluid from said outlet for causing a suction at said suction inlet to draw fluid inwardly therethrough, and means for imparting a swirling motion to the fluid flowing from said source and a corresponding swirling motion to the fluid flowing inwardly from said suction inlet prior to mixing with the fluid from said source, whereby to effect turbulence of said fluid in said passage means to increase the aspirating action thereof.

2. In a filter, an aspirating device adapted to be connected to draw water reversely through said filter, said device comprising, in combination, passage means having an inlet adapted to be connected to receive fluid from a source of pressure fluid and having a discharge outlet, a branch passage connected to an intermediate portion of said passage means between said inlet and said outlet, said branch passage being adapted to be connected at its free end to said filter to supply pressure fluid thereto, means for bleeding pressure fluid from said passage means to create a suction from said filter through said branch passage to said passage means, means providing internal inclined grooves in said passage means to effect turbulence of the fluid passing therethrough to said outlet, and means providing inclined grooves in the branch passage adjoining the point where it joins said passage means to increase such turbulence by imparting a swirling motion to fluid drawn from said filter.

3. An aspirating device including, in combination, passage means having an inlet adapted to receive fluid from a source of fluid pressure and having a discharge outlet, a suction inlet connected to an intermediate portion of said passage means between said inlet and said outlet, a nozzle in said passage adjacent said suction inlet, said nozzle having internal inclined grooves to impart turbulence to the fluid passing therethrough, said nozzle having external inclined grooves formed thereon to impart turbulence to the fluid drawn inwardly through said suction inlet.

4. In a filter, a device for supplying water thereto and for drawing water reversely therethrough, said device comprising, in combination, a tubular T-shaped member having the stem thereof adapted for connection with the filter, one end of the head of the T being adapted to be connected to a source of water under pressure and the other end of the head of the T providing a discharge outlet, and a pair of tubular members located in the respective ends of the head of the T with the tubular member in the end connected to said source telescoped within the end of the other tubular member at the point where the stem of the T joins the head thereof, the tubular member in the end of the T connected to said source being provided with internal and external inclined grooves to impart a swirling motion both to the water from said source and to the water drawn from said filter.

5. In a filter, a device for supplying water thereto and for drawing water therefrom, said device comprising, in combination, a hollow body having a stem extending laterally from its side and adapted to be attached to the filter, one end of said body being adapted to be attached to a source of water under pressure and the other end providing a discharge outlet, and a pair of tubular members mounted in the respective ends of said body with the tubular member in the end connected to said source having a tapered end fitting snugly within the end of the other tubular member at the point where the stem opens into the body, said tapered end having internal and external grooves inclined in the same direction to impart a swirling motion both to the water from said source and to the water from said filter.

6. In a filter, a device for supplying water thereto and for drawing water reversely therefrom, said device comprising a tubular body having a hollow stem extending laterally therefrom for connection with the filter, one end of said tubular body being adapted to be connected to a source of water under pressure and the other end having a discharge outlet, both of said ends being provided with internal shoulders, and a pair of tubular members each having a flange adapted to seat against the respective shoulders and to extend inwardly therefrom, the tubular member in the end connected to said source telescoping within the other tubular member and being provided with internal and external grooves inclined in the same direction to impart a swirling motion both to the water from said source and to the water from the filter.

FRANK P. BLAIR.